US012664670B2

(12) United States Patent
Rosenblum et al.

(10) Patent No.: US 12,664,670 B2
(45) Date of Patent: Jun. 23, 2026

(54) METHOD AND SYSTEM FOR AUTOMATIC DETERMINATION OF REGISTRATION ACCURACY

(71) Applicant: NeuroSimplicity, LLC, Shrewsbury, NJ (US)

(72) Inventors: Jared Rosenblum, Long Branch, NJ (US); Vikram Chandrashekhar, Trabuco Canyon, CA (US); Vibhu Chandrashekhar, Trabuco Canyon, CA (US)

(73) Assignee: NeuroSimplicity, LLC, Branchburg, NJ (US)

( * ) Notice: Subject to any disclaimer, the term of this patent is extended or adjusted under 35 U.S.C. 154(b) by 0 days.

(21) Appl. No.: 19/103,232

(22) PCT Filed: Aug. 14, 2023

(86) PCT No.: PCT/US2023/030126
§ 371 (c)(1),
(2) Date: Feb. 12, 2025

(87) PCT Pub. No.: WO2024/035957
PCT Pub. Date: Feb. 15, 2024

(65) Prior Publication Data
US 2025/0259318 A1 Aug. 14, 2025

Related U.S. Application Data

(60) Provisional application No. 63/397,413, filed on Aug. 12, 2022.

(51) Int. Cl.
*G06T 7/38* (2017.01)
*G06T 7/33* (2017.01)

(52) U.S. Cl.
CPC ............... *G06T 7/38* (2017.01); *G06T 7/337* (2017.01); *G06T 2207/10016* (2013.01)

(58) Field of Classification Search
CPC .. G06T 7/337; G06T 7/30; G06T 7/32; G06T 7/33; G06T 7/344; G06T 7/35;
(Continued)

(56) References Cited

U.S. PATENT DOCUMENTS 5,640,200 A * 6/1997 Michael .................. G06T 7/001
382/160
5,668,595 A * 9/1997 Katayama ............ H04N 13/239
348/43
(Continued)

OTHER PUBLICATIONS

Thomas, Shane, ISA / WO issued in PCT/US23/30126, Oct. 19, 2023, USPTO, Alexandria, VA, USA.

*Primary Examiner* — Henok Shiferaw
*Assistant Examiner* — Woo C Rhim
(74) *Attorney, Agent, or Firm* — Silver Legal LLC; Jarrett L. Silver

(57) ABSTRACT

Automatic determination of registration accuracy between a first image of a first object and a second image of the first object. Identifying a first image element in the first object by scanning the first image sequentially by image unit, and identifying a second image element in the first object by scanning the second image sequentially by the image unit. Registering the first image element to the second image element in a shared background coordinate space. Determining an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space.

(Continued)

400

START

Identify a first image element in the first object by scanning the first image sequentially by image unit. 410

Identify a second image element in the first object by scanning the second image sequentially by the image unit. 420

Register the first image element to the second image element in a shared background coordinate space. 430

Determine an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space. 440

Calculate a difference between the first distance and the second distance. 450

END

Calculating a difference between the first distance and the second distance.

25 Claims, 7 Drawing Sheets

(58) Field of Classification Search
CPC ... G06T 7/37; G06T 7/38; G06T 2207/10016; G06T 7/0012; G06T 3/14; G06T 3/147; G06T 3/153; G06T 3/18; G06V 10/24; G06V 10/242; G06V 10/243; G06V 10/245; G06V 10/247; G06V 10/248
See application file for complete search history.

(56) References Cited

U.S. PATENT DOCUMENTS

| | | | | |
|---|---|---|---|---|
| 6,728,424 | B1* | 4/2004 | Zhu | G06T 7/33 |
| | | | | 382/128 |
| 9,501,839 | B1* | 11/2016 | Korchev | H04N 25/683 |
| 9,761,002 | B2* | 9/2017 | Mundhenk | G06T 7/593 |
| 2001/0036302 | A1* | 11/2001 | Miller | G06T 7/35 |
| | | | | 382/128 |
| 2008/0080788 | A1* | 4/2008 | Nord | G06T 3/153 |
| | | | | 382/128 |
| 2009/0060300 | A1* | 3/2009 | Neemuchwala | A61B 6/463 |
| | | | | 382/128 |
| 2009/0285460 | A1* | 11/2009 | Ishikawa | G09G 5/14 |
| | | | | 382/128 |
| 2010/0040264 | A1* | 2/2010 | Volkau | G06T 7/344 |
| | | | | 382/128 |
| 2011/0069063 | A1* | 3/2011 | Liao | G06T 3/14 |
| | | | | 382/128 |
| 2011/0235884 | A1* | 9/2011 | Schreibmann | A61B 6/037 |
| | | | | 382/131 |
| 2016/0307360 | A1* | 10/2016 | Wiemker | G06T 15/08 |
| 2018/0130217 | A1* | 5/2018 | Ray | G06T 3/153 |
| 2019/0220965 | A1* | 7/2019 | Cao | G06T 7/337 |
| 2020/0098117 | A1* | 3/2020 | Kask | G16H 50/50 |
| 2023/0252751 | A1* | 8/2023 | Garcia | G06T 7/33 |
| | | | | 382/294 |

* cited by examiner

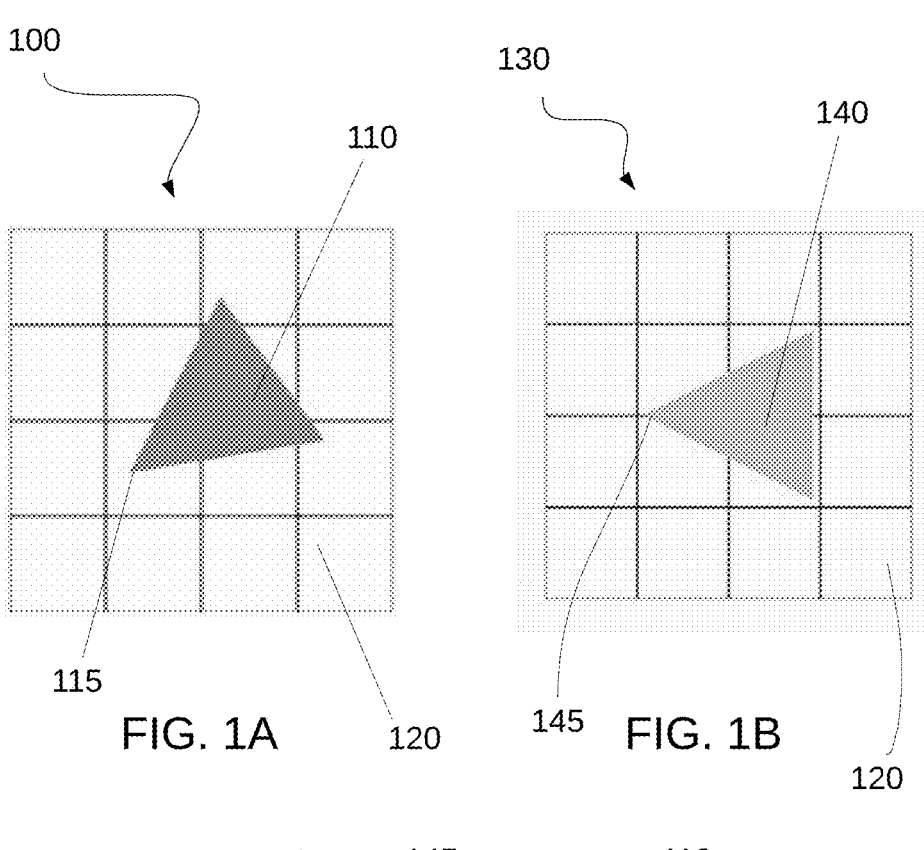
FIG. 1A
FIG. 1B
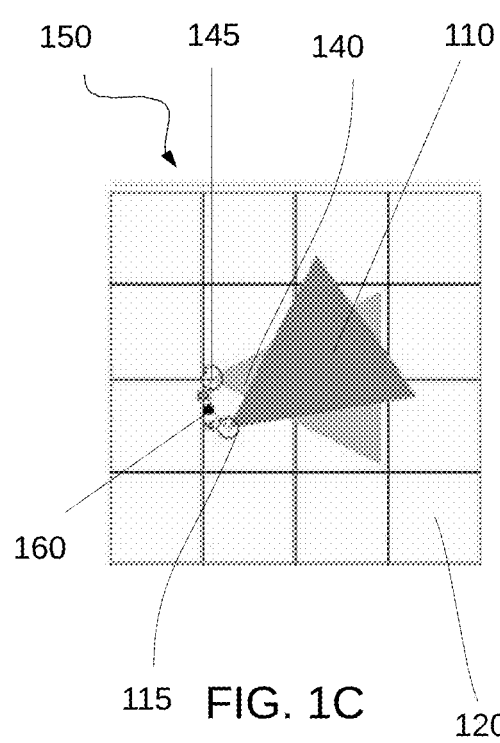
FIG. 1C

300

310

320

330

140                    120

400

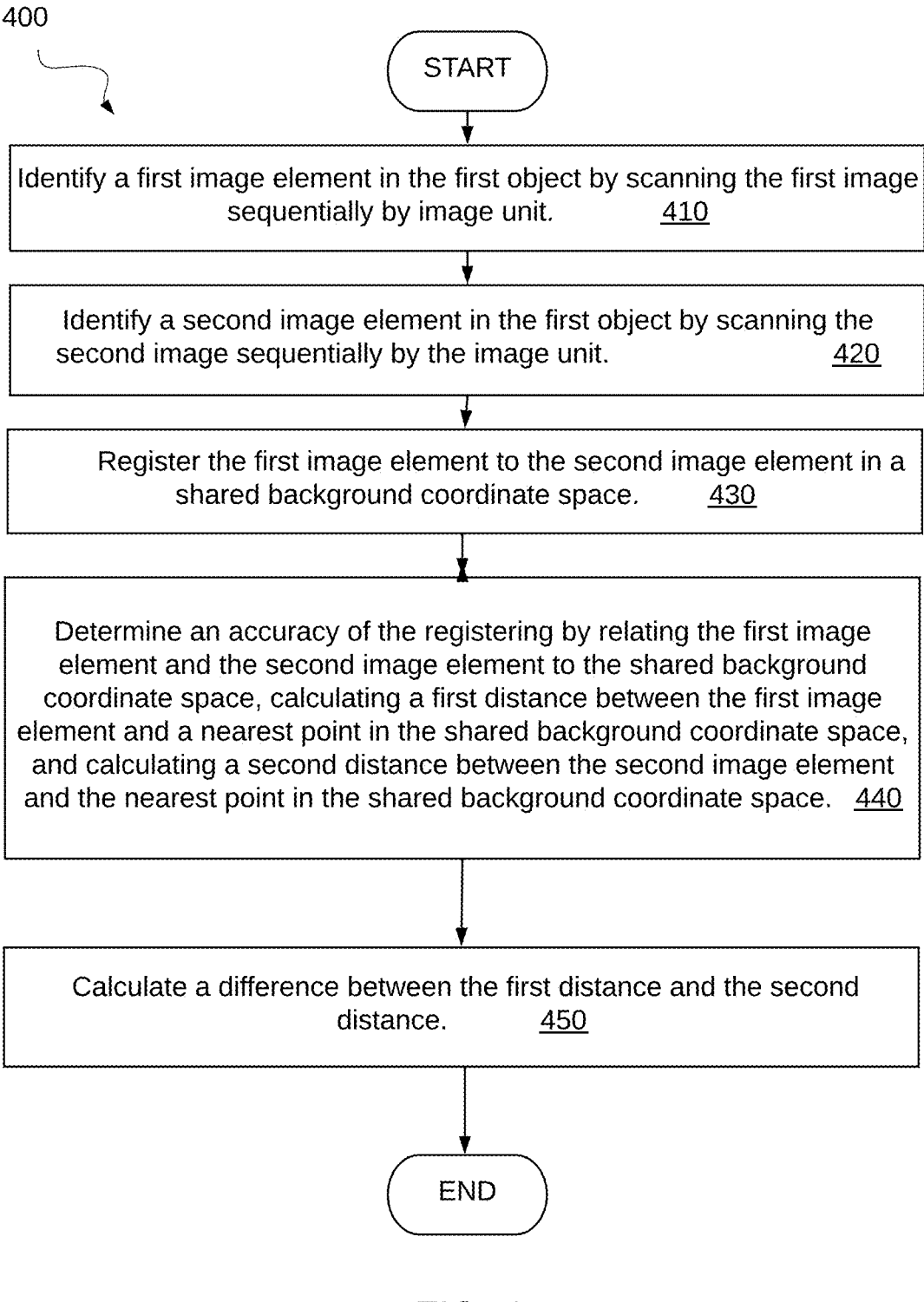

START

Identify a first image element in the first object by scanning the first image sequentially by image unit.          410

Identify a second image element in the first object by scanning the second image sequentially by the image unit.          420

Register the first image element to the second image element in a shared background coordinate space.          430

Determine an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space.   440

Calculate a difference between the first distance and the second distance.          450

END

METHOD AND SYSTEM FOR AUTOMATIC DETERMINATION OF REGISTRATION ACCURACY

CROSS-REFERENCE TO RELATED APPLICATIONS

The present application is a 35 U.S.C. § 371 national stage application of PCT Application No. PCT/US2023/030126 filed on Aug. 14, 2023, which claims priority to and benefit of U.S. Provisional Patent Application No. 63/397,413, filed Aug. 12, 2022. The applications are incorporated by reference in their entirety.

BACKGROUND OF THE INVENTION

1. Field of the Invention

The invention relates to image registration and assessing registration accuracy without the use of landmarks or proxies for accuracy. Coordinate systems derived from each image in the dataset are used, as well as background coordinate systems to determine intended target points for alignment.

2. Description of the Related Art

Image registration is the process of computing a transformation that aligns two or more images (for 2 images, a moving and fixed image, where the moving image is the image being transformed) to each other, typically based on manual landmarking of corresponding points, and/or pixel/voxel intensity values (landmark free). To assess the quality of image registration, accuracy metrics are necessary. Currently, the accuracy metrics used fall into two categories: landmark-based and landmark free. Typically, a method called target registration error, which computes the average distance between corresponding landmarks, is used. Corresponding landmarks refer to the same point in the data sets selected by an expert in the field. To bypass manual intervention, proxies for accuracy using landmark-free methods, such as image similarity, were developed. Unlike landmark-based methods, the landmark-free methods are only proxies for accuracy because they are not calculating the distance between points with meaningful correspondence as determined by experts. Further, some of these metrics are not comparing points directly and can lead to perverse similarity results. Image similarity metrics assume that the points in multiple aligned datasets correspond. Then, proxies of registration accuracy between assumed corresponding points are calculated, such as comparing intensities of close points within the multiple datasets.

There currently exists no method or system to do the following things together automatically:

1. Integrate images from multiple modalities/sources using registration;
2. Analytically and quantitatively compare registered images to the source image;
3. Determine quality of registration using one or more metrics as well as additional image analyses in a landmark-free method (with intended points); and
4. Interactively visualize registration quality in one of several ways, e.g. graphically or tabularly.

SUMMARY OF THE INVENTION

An exemplary method for automatic determination of registration accuracy between a first image of a first object and a second image of the first object is provided. The method includes identifying a first image element in the first object by scanning the first image sequentially by image unit, and identifying a second image element in the first object by scanning the second image sequentially by the image unit. The method further includes registering the first image element to the second image element in a shared background coordinate space. The method also includes determining an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space. The method further includes calculating a difference between the first distance and the second distance.

The method may include identifying an amount of deformation of the second object required to make the second object match the first object.

In the method, the first image and the second image may be two-dimensional, and the image unit may be a pixel. The scanning of the first image sequentially may be row by row, and the scanning of the second image sequentially may be row by row. The scanning of the first image sequentially may be circling from a first perimeter of the first image inward, and the scanning of the second image sequentially may be circling from a second perimeter of the second image inward.

The first image and the second image may be three-dimensional, and the image unit may be a voxel. The scanning of the first image sequentially may be row by row, and the scanning of the second image sequentially may be row by row. The scanning of the first image sequentially may be circling from a first perimeter of the first image inward, and the scanning of the second image sequentially may be circling from a second perimeter of the second image inward.

The method may include repeating the steps of the method for further first image elements and further second image elements. The registering of the first image element to the second image element in the shared background coordinate space may include registering the further first image elements to the further second image elements in the shared background coordinate space, and minimizing a sum of the difference between the first distance and the second distance and further differences between further first distances and further second distances An exemplary system for automatic determination of registration accuracy between a first image of a first object and a second image of the first object is provided. The system includes a scanner configured to identify a first image element in the first object by scanning the first image sequentially by image unit. The scanner is further configured to identify a second image element in the first object by scanning the second image sequentially by the image unit. The system includes a processor coupled to the scanner and configured to register the first image element to the second image element in a shared background coordinate space. The processor is further configured to determine an accuracy of the registering by relating the first image element and the second image element to the shared background coordinate space, calculate a first distance between the first image element and a nearest point in the shared background coordinate space, and calculate a second distance between the second image element and the nearest point in the shared background coordinate space. The processor is further configured to calculate a difference between the first distance and the second distance.

The exemplary system may include a deformation calculator, operating on the processor, for identifying an amount of deformation of the second object required to make the second object match the first object.

In the exemplary system, the first image and the second image may be two-dimensional, and the image unit may be a pixel.

In the exemplary system, the first image and the second image may be three-dimensional, and the image unit may be a voxel.

In the exemplary system, the difference between the first distance and the second distance may be minimized.

A non-transitory computer-readable medium is provided for storing a program for automatic determination of registration accuracy between a first image of a first object and a second image of the first object. The program includes instructions that, when executed by a processor, causes a processor to identify a first image element in the first object by scanning the first image sequentially by image unit, and identify a second image element in the first object by scanning the second image sequentially by the image unit. The program also causes the processor to register the first image element to the second image element in a shared background coordinate space. The processor also determines an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space. The processor also calculates a difference between the first distance and the second distance.

The program may further include instructions that, when executed, cause the processor to identify an amount of deformation of the second object required to make the second object match the first object.

The program may also include instructions that, when executed, cause the processor to minimize the difference between the first distance and the second distance.

BRIEF DESCRIPTION OF THE DRAWINGS

The invention is described in more detail with reference to the accompanying drawings, in which only preferred embodiments are shown by way of example. In the drawings:

FIGS. 1A-1C illustrate schematically the registration of two basic images according to an exemplary embodiment of the present technology;

FIG. 4 is a flowchart illustrating an overview of an exemplary method according to the present technology;

DETAILED DESCRIPTION

Figure 2:
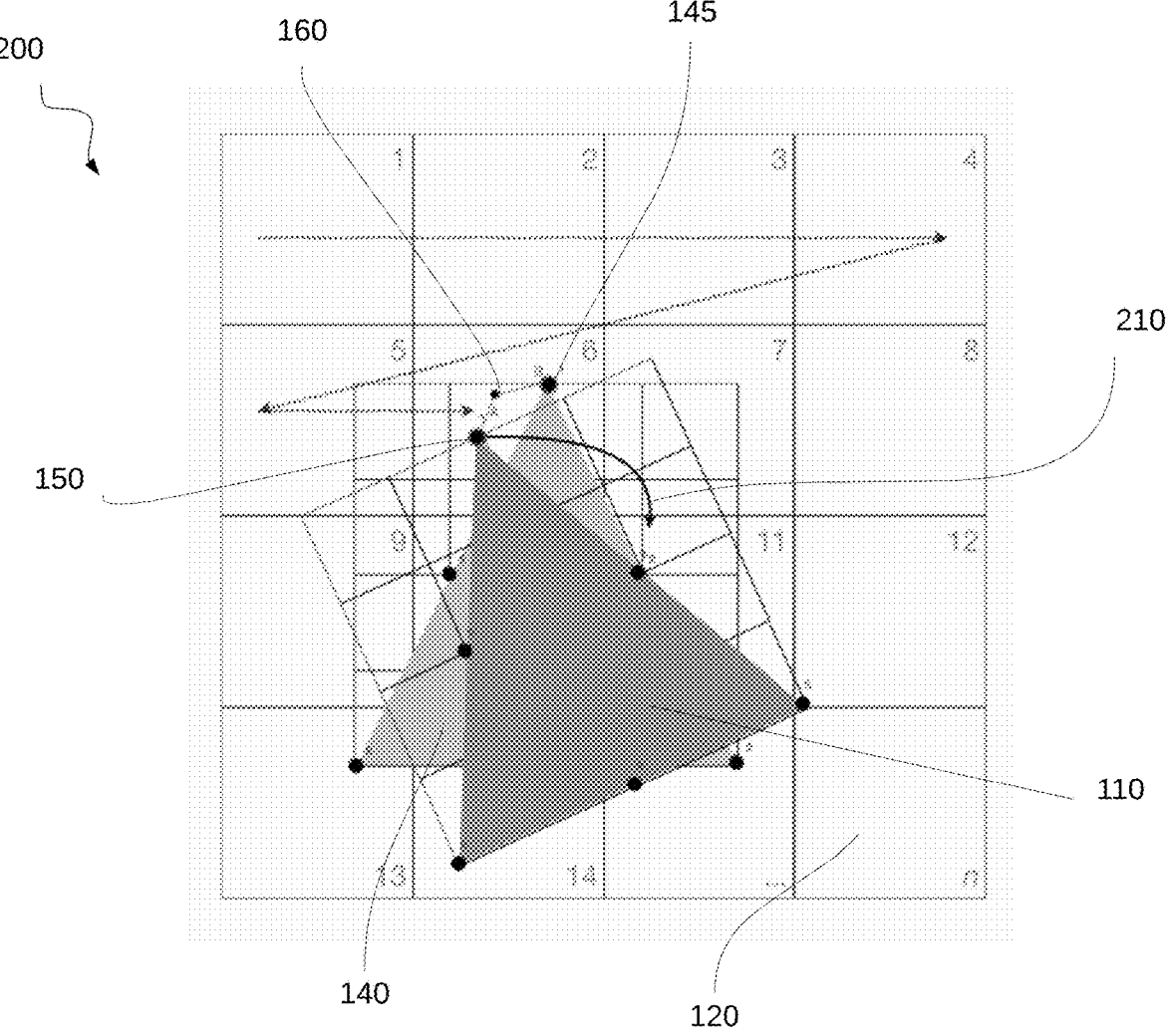
FIG. 2 illustrates schematically the registration of two objects according to an exemplary embodiment of the present technology.

Image registration is used to align two or more images and gauging the accuracy of these registrations is critical in variety of applications. Historically, registration accuracy has been assessed by having experts place landmark points which they know have meaning and correspondence in the data being registered to compute how close points in the images are in the registration. Because this requires manual intervention, when you are trying to assess the quality of a registration without having to manually place landmarks, you would use an image similarity metric, which is at best a proxy of true accuracy. The present technology provides a novel method of calculating distances between points in images being registered and intended points to which they should be registered in a separate coordinate system. This enables calculation of the true registration accuracy automatically.

A method and system to automatically calculate registration accuracy is disclosed. This method may be applied to a method and system to extract, register, analyze, interpret, visualize, and interact with data from within the same dataset and/or data from different sources, which is acquired at a same time-point or different time-points, which may be from a same or different sample and/or patient, and which may optionally be displayed in the same visualization. This method uses data-driven coordinate systems to calculate multiple distances between multiple points within multiple datasets and automatically determine intended targets. The order in which these steps are performed can be modified to suit the information provided and the application. The system enables automatically determining registration accuracy of data that has been extracted, registered, analyzed, interpreted, and visualized. This novel method of calculating registration accuracy allows for the calculation of registration accuracy without landmarks and manual intervention. Thus, this process is inherently automated.

The automation is the result of a novel way to calculate registration accuracy and is utilized in a registration pipeline and related system to extract, register, analyze, interpret, visualize, and interact with data. This particular algorithm also works in a standalone fashion for many other uses. One example of another use is in GPS position and object tracking. The method and system could also be used for machine calibration. For instance, if image 1 taken with machine 1 has high confidence, then image 2 taken with machine 2 can be used to recalibrate machine 2. The method and system can be used for anything having multiple images that have objects in them.

Various methods may be used to implement the invention. The following exemplary method is disclosed. Beginning with two images, which may be an image 1 taken of subject 1 at time 1, and image 2 of subject 2 at time 1, or subject 1 at time 2. In both images there are objects in the image and negative space. Here we define negative space as any pixel/voxel/location within an image that is not in the object. Because images are always captured on some form of a detector-a camera has a detector with defined pixels—there is inherently one coordinate system in the negative space of one image and another coordinate system inherent to the object space within the same image. Then, in the second image there is the same relationships. Therefore, the following:

1. Image 1 Coordinate Space
2. Object 1 Coordinate Space
3. Image 2 Coordinate Space
4. Object 2 Coordinate Space Now, when the registration is performed, the images are registered deformably and invertibly. Meaning, either Image 1 is registered to Image 2 or vice versa but it will be in the space of whichever is chosen to use as the "reference" space.

For example, registering Image 1 to Image 2 causes Object 1 to be deformed to Object 2 in Image 2 Coordinate Space. Then both objects are in the same coordinate space, and the known positions (correspondence) of the coordinate space can be used. In other words, every pixel in the negative space has an exact meaning.

Consider the grid below:

| 1 | 2 | 3 | 4 |
|---|---|---|---|
| 5 | 6 | 7 | 8 |

This is a simple 4×2 grid. The top left is position 1, the next spot over is position 2, and so on. In one embodiment of a method of implementing identification of the corresponding points in the image space, if it is assumed that the intensity in the image space is related to the object in this space (which can be done by removing noise or using masks or segmented objects for registration), then moving through this grid from top left to bottom right (i.e., from 1 to 8) leads to the first pixel with intensity in the grid, which is defined as the first point in the object. Then, a grid is defined within the object space by moving in a direction, such as clockwise, and numbering the pixels in the object in this direction in ascending order. Thus, a discretized coordinate system for the object is created within the coordinate system of the background space. This is done for both objects in the same background coordinate space following registration as outlined above. Because the method involves moving through the image space in ascending order to find the pixels with intensity, i.e. the objects, the assumption is made that we will always arrive at the first point in the object within the grid and that, given these objects are similar, which they should be if they are being registered to each other, then this point will be similar on the two objects. This assumption is discussed in detail below.

In this way, points that may be overlapping and non-corresponding will not be compared to each other, which would yield a falsely low distance between points, or a falsely high degree of accuracy. This is because overlapping points, if there is any translation, shear, or other deformation in the object within the image, should not have the same numeric position assigned to them when discretizing the object. Once the points on the objects and the points in the background coordinate space are discretized as above, the distance between a point on the object and its nearest point in the background coordinate space can be calculated. This is also done for the same numeric point on the other object and the same background coordinate space point. Then, these two calculated distances are compared, for example, by calculating the difference between them, as shown in the FIG. 1C.

The method involves moving through the image space in ascending order to find the pixels with intensity, i.e. the objects. The assumption mentioned above is that we will always arrive at the first point in the object within the grid and that, given these objects are similar, which they should be if they are being registered to each other, then this point will be similar on the two objects. The first part of this statement is that we will always arrive at the first point in the object within the grid. This is not an assumption.

The second part of the statement is that, given these objects are similar, which they should be if they are being registered to each other, then this point will be similar on the two objects. This assumption may not necessarily hold in a few scenarios.

First, if the orientation of the two images is so disparate that the first point encountered in one object is not nearly the same as the first point encountered in the other object, then the accuracy calculated by calculating the distances between the corresponding points in the grid and the intended background point would be falsely high. However, to circumvent that, in the disclosed method and system, users are provided the opportunity to provide rough alignments of orientation. If a similar object is imaged in a similar position relative to the detector, however, this should not be a problem. For example, in clinical scans, people are always oriented the same way in the scanner. This method of counting ascending pixels is only one exemplary embodiment.

Second, if the objects being registered to each other are not at all similar, while the assumption does not break down (as in the first point) because technically speaking, the first point encountered in the grid is by definition the first point in the object that we then assign numerical value to in ascending order, this relationship to the other object may not be meaningful. Meaning, that a registration accuracy between two numerically similar points in the object grids will be compared to their nearest intended point in the background, but it will not necessarily have contextual meaning, i.e. the same point on two skulls for example vs one point on a skull and one point on a heart. However, it is assumed that no one should be trying to register a heart and a skull to each other.

Third, in the event of particularly perverse deformations during registration of one image to the other, points in one object may be arrived at that are very far away from where they should be in the background space. However, this still would not invalidate the assumption being made. Meaning, the first point encountered in the image with meaningful intensity values (i.e. after removal of noise, etc.) should still be the first meaningful point in the object numerically speaking, because we are assigning positions in the object grid in an ascending arbitrary manner just to discretize the object in a way we know has context that is meaningful to us.

This situation involves perverse deformations generated in the process of registration. It is possible here that the first selected points on both objects are not truly corresponding. For example, the perverse deformation could change the orientation of one of the objects so that it falls under the first situation described above. In this situation, the metric may provide a falsely high accuracy.

Figures 6A, 6B:
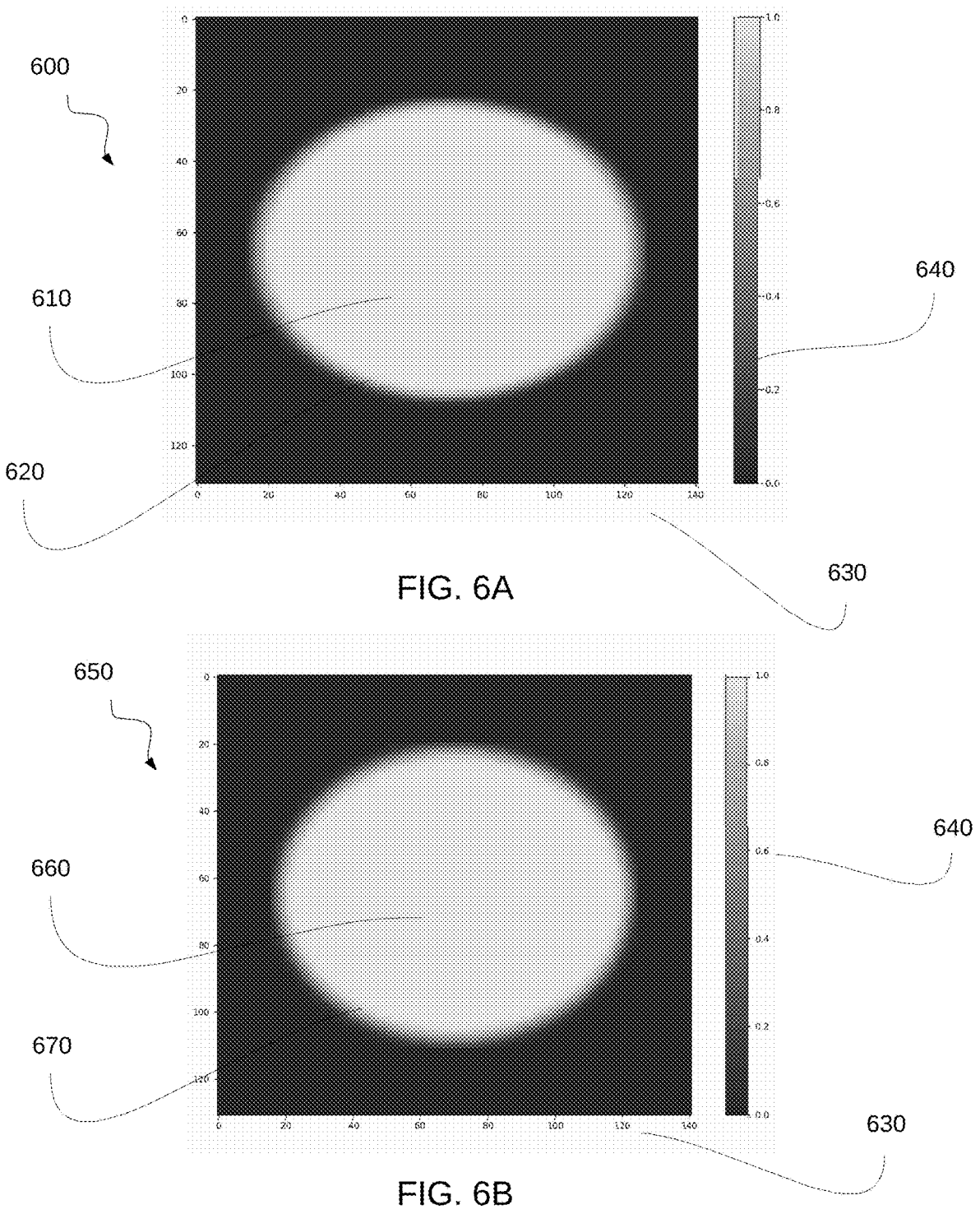
FIG. 6A illustrate an image being used in a registration in an exemplary embodiment of the present invention.
FIG. 6B illustrates the image shown in FIG. 6A registered with another image in an exemplary embodiment of the present invention.
Figure 7:
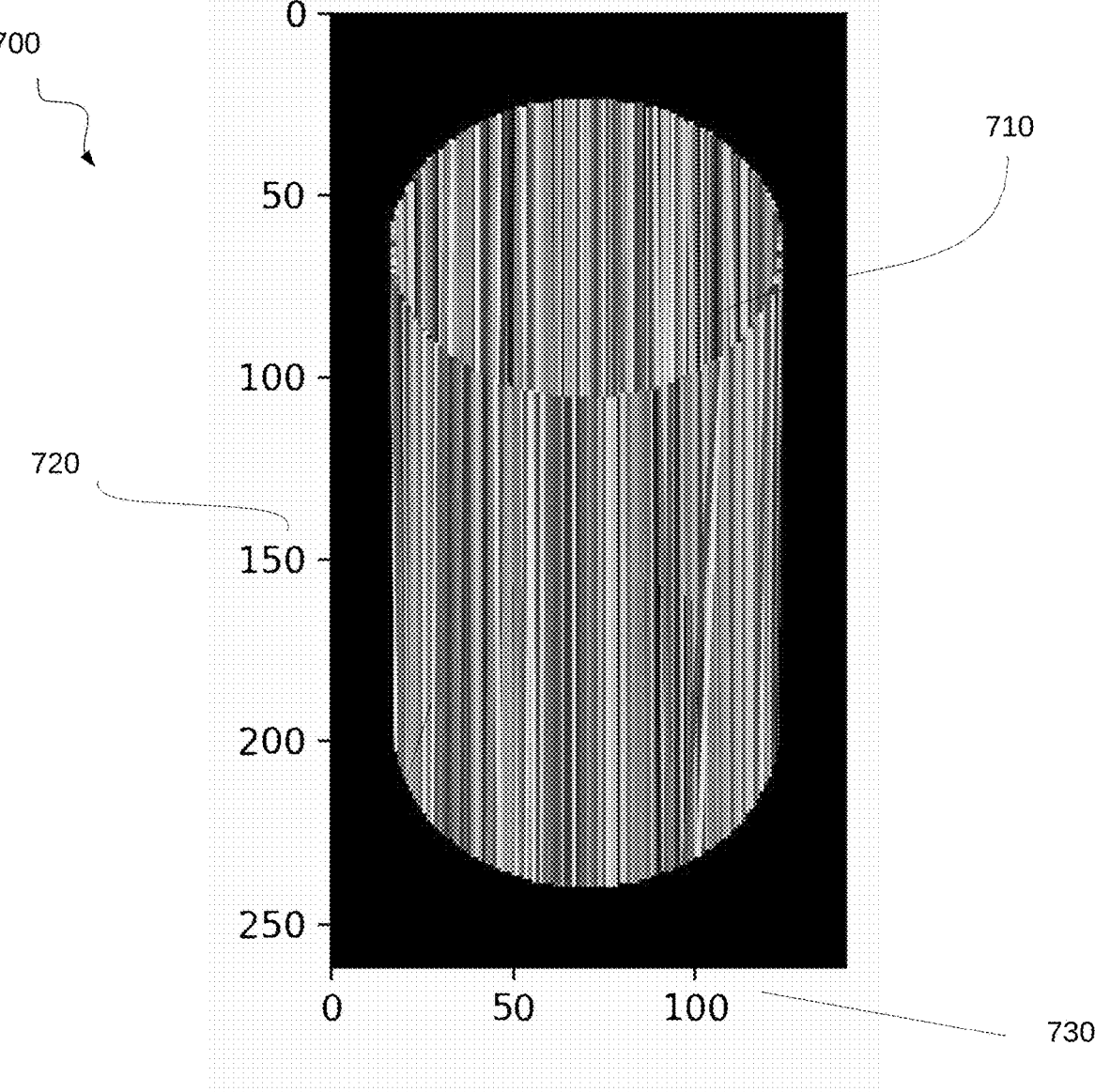
FIG. 7 illustrates a false color representation of an amount of deformation in the registration of the two images in FIGS. 6A and 6B.

To further illustrate the method in practice, see FIGS. 6A, 6B, and 7. FIG. 6A is a first example image, FIG. 6B is the first image registered to a second image. FIG. 7 is a point correspondence image. In a perfect registration, the image in FIG. 6A and the image in FIG. 6B should line up perfectly. The point correspondence image in FIG. 7 shows the boundary of the first image on top and the boundary of the registration of the first image to the second image on the bottom with colored lines indicating the points automatically identified as corresponding. If the method works as described, the top point of the ellipse in both images corresponds to each other along with each point along both ellipses moving clockwise, generating a cylinder. As is apparent in FIG. 7, a cylinder illustrating the exemplary method works as expected.

Therefore, though there are ways in which the meaning of the point may break down, the assumption that the first point with meaningful values in the grid should be the first point in the object generally holds true.

There are many ways to do this and this is just one example. The invention is the automatic determination of registration accuracy by data-driven determination of correspondence. This can be applied to anything that requires assessing the accuracy of comparing to things in an image or in two images registered to each other.

The output after registering the images is a transformation that maps every point from one image to every point in another image. In other words, it is a one-to-one mapping between the coordinate systems of image 1 and image 2.

Figure 3:
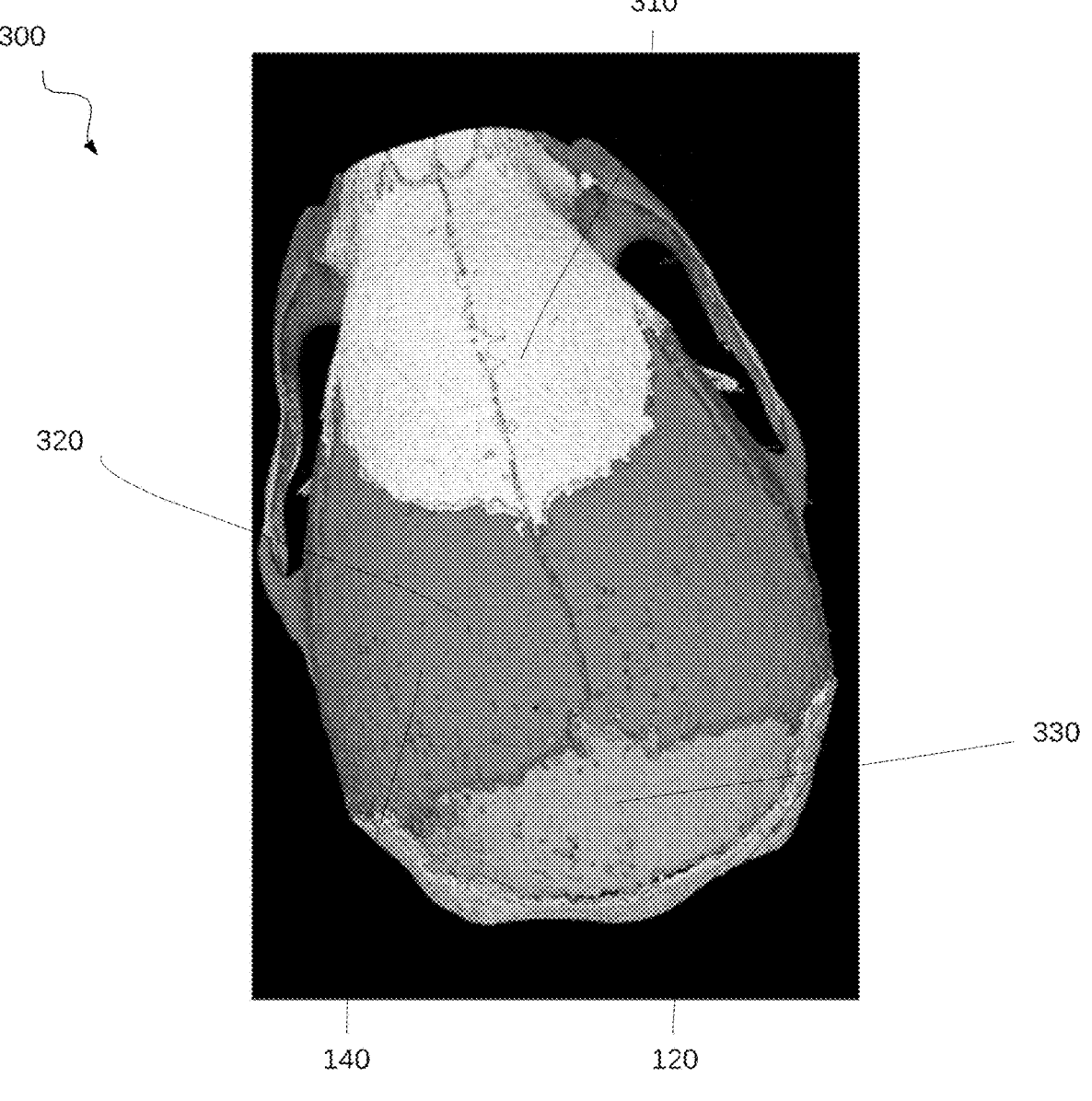
FIG. 3 illustrates a false color image of registered images illustrating correspondence according to an exemplary embodiment of the present technology.

The transformation that is produced by the registration can be used to create an image with a false color indicating local deviation across the image either in the space of image 1 or image 2. See FIG. 3 showing an example image of a grayscale object where light gray indicates shrinkage in portion 330, dark gray indicates expansion in portion 320, and white indicates no change relative to another image of an object, in portion 310.

An "average image" or "average object" can be created as well, and are sometimes referred to as "atlases".

Theoretically, any direction or method of traveling through the grid of the images (eg, scanning left to right, top to bottom, or clockwise/counter-clockwise, may be used in the exemplary technology. It should not matter since moving through the grid of the image and the background (essentially two images) to number them is to create a relation between the two images. This does not even have to be done just by sequentially moving through the image and numbering locations or pixels per se.

In the present technology, two relative spaces are created within one image: a foreground (object) and a background (detector of the camera). Doing this with two images, then the images may be considered to share the background. In this way, the object in one image can be put it in the space of the other image containing the other object (which is required for registration), and then they share the background.

The locations of the pixels in the image of the background will always be the same and have a real world, grounded truth in the physical detector elements. The objects in the images can be considered as separate images themselves, with their own coordinate systems and this can be numbered relatively, pixel by pixel or voxel by voxel, and then, as long as the known locations in the detector grid are numbered in the same way, they can be compared. One embodiment of that and the easiest way conceptually, is to go from left to right and then top to bottom because the detector is already numbered that way in the computer when it is built.

Another potential embodiment is to introduce a third virtual space with exact known coordinates, then compare that to the numbered locations in the object in the image and the background of the image, assuming, again, that they are numbered in the same manner. The logic here may be more similar to expert landmarking.

In alternative exemplary embodiments, a Hausdorff distance is calculated and some more standard metrics like mean squared distances between corresponding voxels. However, there are points at which these methods fail in comparison to the present technology.

In practice, the following steps may be performed:
1. determine nearest neighboring voxels and boundary voxels between the two images and compute distances between them
2. determine which boundary has more voxels
3. create a 3D spatial organization of both sets of boundary voxels. There are various methods to do this, for example k-d tree.
4. compute pairwise distances between neighboring boundary voxels, depending on which boundary has more voxels.
5. obtain the unique indices in the other boundary for each point in the boundary with fewer voxels. The index contains the indices of the smaller shape voxels that have unique mappings to the larger shape voxels. (This is creating the relationship referred to above).
6. track which corresponding voxels have already been calculated
7. do not reconsider those points that have already been used
8. map the indices (distances) from the smaller shape to the larger one.
9. set the current unique indices given the original index containing the smaller shape voxel mappings (step 5).
10. create a new k-d tree with the remaining points
11. get the closest points in tree1 to the remaining points in the smaller tree. This creates the relationship in 3D.
12. display the calculated distances.

When a deformation between two images is performed, a transformation is calculated. This is an equation that relates corresponding points in the images. The exact amount of change to each point in the image is known, but how closely lined up two desired points in the two images is not known. Registration accuracy is a measure of how closely lined up are two desired points. For example, below (the 1s are the desired points, the 0s are background):

| Image 1 | | | |
| --- | --- | --- | --- |
| 0 | 0 | 1 | 0 |
| 0 | 1 | 0 | 0 |
| Image 2 | | | |
| 0 | 0 | 1 | 0 |
| 0 | 1 | 0 | 0 |

In the example above, the same points line up. These two images are verifiably the same by inspection. However, for a computer to determine the images are the same, the computer has to know the relative positions of the 1s compared to the 0s. Since the background of both images is the same, the backgrounds can be considered to be shared. However, what happens in registration, if a perverse result occurs, is the following:

| Image 1 after registration | | | |
| --- | --- | --- | --- |
| 0 | 1 | 0 | 0 |
| 0 | 1 | 0 | 0 |

In this version, the 1 in the first row has moved to the left by one pixel. Now, if this was the only information available, then the starting point would need to be known to be able to determine that this is wrong. However, the present technology does not compare the starting point of image 1, but rather compares to the desired position of the 1 in the first row of image 2. This is still wrong and would still be wrong if the output of image 2 remained the same as its starting point, which it will because in image registration, one image is maintained as fixed, meaning no deformation is made to it, while one is moving. In this case, image 1 as moving and image 2 as fixed.

The present technology discusses obtaining a first correspondence point between two images of the same/similar object, and measuring a distance and angle (a vector) between them. The algorithm carries on in the same fashion after identifying the same correspondence, by scanning, while not reusing previously used points.

This would identify an edge in each image, which can be associated. Points along an edge are identified as corresponding points in exemplary embodiments only after reaching a corner that can be associated between the two images. Boundary detection is used, indices, and k-d tree are used determine this. In 2D a corner would need to be found because in a single 2D plane, a pixel only has a maximum of 3 pixel neighbors. In 3D, a voxel has 27 voxel neighbors, so a boundary exists in some direction if a similar intensity is not present on all sides.

Finding a boundary is another embodiment of finding a relationship to the background. In 2D and on small images and small grids, exemplary methods move through the image pixel by pixel and label the pixels in the object (as determined by pixels with intensity as described above) and compare the relative position of a pixel in object 1 to the background pixel on the grid and to the nearest pixel in object 2 in the same shared grid. However, in 3D and in larger images, this is computationally intensive. To determine whether images have been registered well, boundaries and/or edges can be assessed. In this exemplary embodiment, the edges and/or boundaries of object 1 are found in the image in the shared coordinate space, the edges and/or boundaries in object 2 are found in that same coordinate space, and a distance separating those boundaries is determined from each other and from the positions on the coordinate space, which as described above, have ground truth positioning. If the same boundaries in each object line up, are close to each other in space, and are close to the nearest position on the grid, registration accuracy is likely high.

In 3D, a boundary will likely exist in some direction because a similar intensity is likely to not be present on all sides.

If all of the vectors relating a first and second image have the same value (distance and direction), the images have merely been moved within the coordinate space, but there is a 100% correspondence (0% deformation) between the two images. The exemplary system shows the same as if a deformation was required by showing that all of the coordinate locations in the object are lined up. This is a rigid registration (affine or translation or shear, with no deformation). Since the boundaries represent sets of positions, the exemplary method compares sets of numbers to sets of other numbers.

A minimization function performed to pair up positions as corresponding that make the sum of the distances computer as small as possible. A minimization function is used to register two images together, by reducing a difference between a first distances from a first proposed corresponding object point (also referred to as an image element) to a shared background and a second distances from a second proposed corresponding object point to the shared background.

Once two images are registered, the two foreground objects are now in the same coordinate space. Assuming the registration has happened and this is a minimized state, the method calculates the distance between the boundary or point on each object and the nearest point in the background coordinate system. Since the coordinate system is the background of the reference image, which was not moving during the registration, those positions in the coordinate system did not change with minimization. They still represent their original position and therefore ground truth. So they maintain their original correspondence unaffected by minimization. Then the distance between the point or boundary on the object and this nearest background point is calculated to determine the accuracy of the registration.

The Figures are described in detail as follows.

FIGS. 1A-1C illustrate schematically the registration of two basic images according to an exemplary embodiment of the present technology. In FIG. 1A, image 100 is shown that includes object 110 and background 120. Object 110 includes corner landmark 115. In FIG. 1B, second image 130 is shown that includes second object 140 and background 120. Second object 130 includes second corner landmark 145. In FIG. 1C, third image 150 is shown that includes first object 110 and second object 140 and background 120. In third image 150, corner landmark 115 of object 110 is identified as corresponding to second corner landmark 145 of second object 130, and vector 160 is determined between corner landmark 115 and second corner landmark 145.

FIG. 2 includes fourth image 200 which illustrates schematically the registration of object 110 and second object 130 on background 120 according to an exemplary embodiment of the present technology. In fourth image 200, corner landmark 115 of object 110 is identified as corresponding to second corner landmark 145 of second object 130, and vector 160 is determined between corner landmark 115 and second corner landmark 145. Vector 160 represents a distance between the corner landmarks on the object and the landmark in the nearest numbered location in the background coordinate space. Additionally in fourth image 200, arrow 210 illustrates an arrow signifying the clockwise proceeding of numbering the points on the object in ascending order.

FIG. 3 illustrates false color image 300 (which is shown in grayscale) of registered images illustrating correspondence according to an exemplary embodiment of the present technology. In false color image 300, light gray indicates shrinkage in portion 330, dark gray indicates expansion in portion 320, and white indicates no change relative to another image of an object, in portion 310.

FIG. 4 is a flow chart illustrating method 400 according to the present invention. The flow in method 400 flows from the start oval to operation 410, which indicates to identify a first image element in the first object by scanning the first image sequentially by image unit. From operation 410, the flow in method 400 proceeds to operation 420, which indicates to identify a second image element in the first object by scanning the second image sequentially by the image unit. From operation 420, the flow in method 400 proceeds to operation 430, which indicates to register the first image element to the second image element in a shared background coordinate space. From operation 430, the flow in method 400 proceeds to operation 440, which indicates to determine an accuracy of the registering by relating the first image element and the second image element to the shared background coordinate space, calculating a first distance between the first image element and a nearest point in the shared background coordinate space, and calculating a second distance between the second image element and the nearest point in the shared background coordinate space. From operation 440, the flow in method 400 proceeds to operation 450, which indicates to calculate a difference between the first distance and the second distance. From operation 450, the flow in method 400 proceeds to the end oval.

Figure 5:
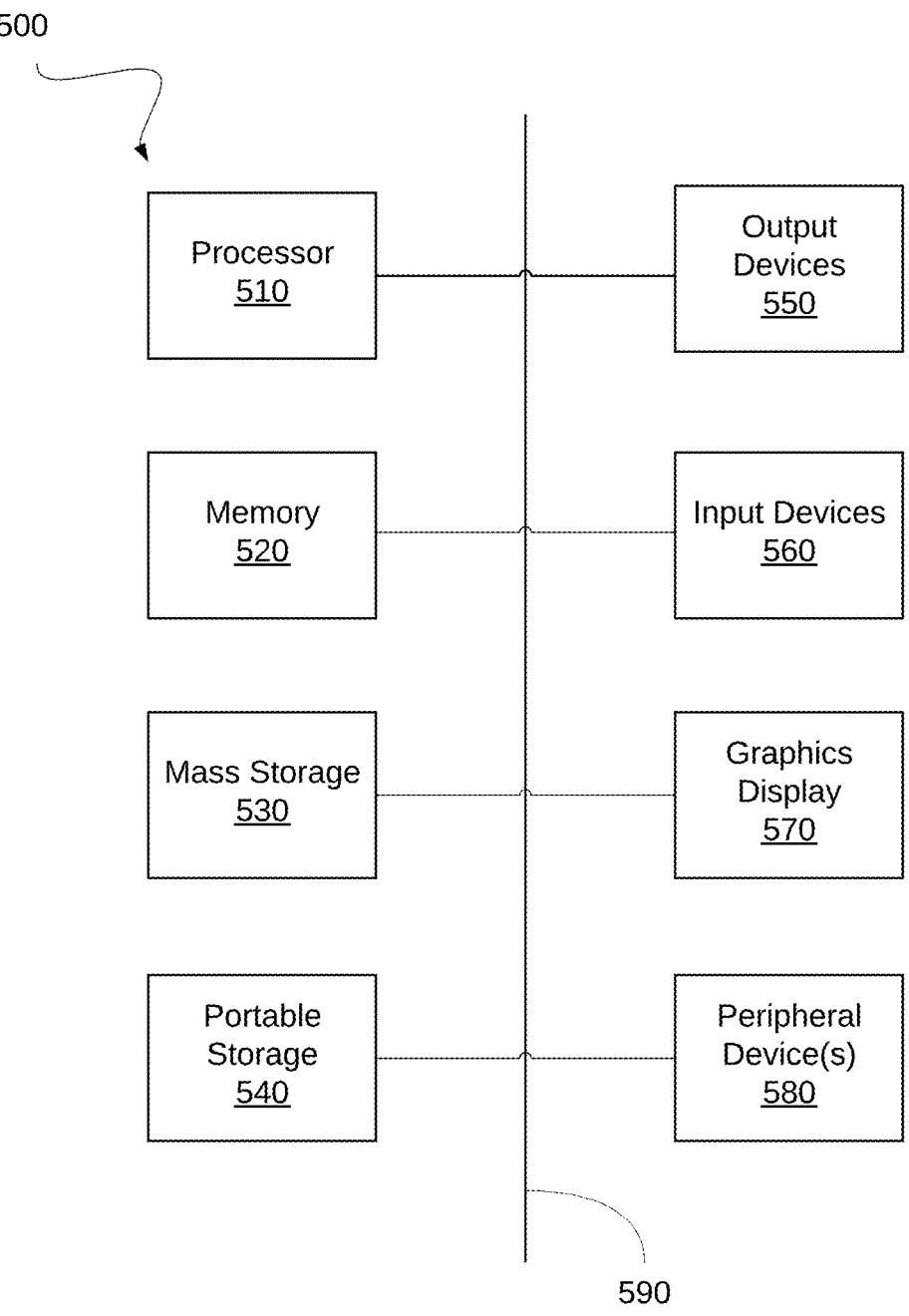
FIG. 5 is a schematic diagram of computing system used in an exemplary embodiment of the present invention.

FIG. 5 is a schematic diagram of computing system used in an exemplary embodiment of the present invention. FIG. 5 illustrates exemplary computing system 500, hereinafter system 500, that may be used to implement embodiments of the present invention. The system 500 may be implemented in the contexts of the likes of computing systems, networks, servers, or combinations thereof. The system 500 may include one or more processors 510 and memory 520. Memory 520 stores, in part, instructions and data for execution by processor 510. Memory 520 may store the executable code when in operation. The system 500 may further includes a mass storage device 530, portable storage device(s) 540, output devices 550, user input devices 560, a graphics display 570, and peripheral device(s) 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present invention for purposes of loading that software into memory 520.

Portable storage device 540 operates in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 500 via the portable storage device 540.

User input devices 560 provide a portion of a user interface. User input devices 560 may include one or more microphones, an alphanumeric keypad, such as a keyboard, for inputting alpha-numeric and other information, or a pointing device, such as a mouse, a trackball, stylus, or cursor direction keys. User input devices 560 may also include a touchscreen. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral devices 580 may be included and may include any type of computer support device to add additional functionality to the computer system.

The components provided in the system 500 are those typically found in computer systems that may be suitable for use with embodiments of the present invention and are intended to represent a broad category of such computer components that are well known in the art. Thus, the system 500 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, IOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

FIG. 6A illustrates image 600 including object 610 with edge 620. Image 600 includes horizontal scale 630 shown in units of length, and vertical scale 640 also shown in units of length, which may be for example micron or millimeters.

FIG. 6B illustrates image 650, which is a composition of object 610 from image 600 from FIG. 6A with another image overlaid. Image 650 includes object 660 with edge 670. Image 650 includes horizontal scale 630 shown in units of length, and vertical scale 640 also shown in units of length, which may be for example micron or millimeters.

FIG. 7 illustrates a false color representation (shown in grayscale) of an amount of deformation in the registration of the object 610 and the corresponding object as shown in FIG. 6B. FIG. 7 includes point correspondence image 700, which shows the boundary of image 650 on top and the boundary of the registration of the image 650 to the second image on the bottom with colored lines indicating the points automatically identified as corresponding. If the method works as described, the top point of the ellipse in both images corresponds to each other along with each point along both ellipses moving clockwise, generating cylinder 710. As is apparent in FIG. 7, cylinder 710 illustrating exemplary method works as expected. Image 700 includes horizontal scale 730 shown in units of length, and vertical scale 740 also shown in units of length, which may be for example micron or millimeters. The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

The invention claimed is:

1. A method for automatic determination of registration accuracy between a first image of a first object and a second image of a second object, comprising:

identifying a first image element in the first object by scanning the first image sequentially by image unit;

identifying a second image element in the second object by scanning the second image sequentially by the image unit;

registering the first image element to the second image element in a shared background coordinate space;

determining an accuracy of the registering by relating the first image element and the second image element to the shared background coordinate space, calculating a first distance between the first image element and a nearest point in the shared background coordinate space, calculating a second distance between the second image element and the nearest point in the shared background coordinate space, and calculating a difference between the first distance and the second distance, wherein the first image and the second image are two-dimensional;

the image unit is a pixel;

the scanning of the first image sequentially is circling from a first perimeter of the first image inward; and the scanning of the second image sequentially is circling from a second perimeter of the second image inward.

2. The method of claim 1, further comprising identifying an amount of deformation of the second object required to make the second object match the first object.

3. The method of claim 1, wherein:

the scanning of the first image sequentially is row by row; and the scanning of the second image sequentially is row by row.

4. The method of claim 1, further comprising repeating the steps of the method for further first image elements and further second image elements.

5. The method of claim 4, wherein the registering of the first image element to the second image element in the shared background coordinate space comprises registering the further first image elements to the further second image elements in the shared background coordinate space, and minimizing a sum of the difference between the first distance and the second distance and further differences between further first distances and further second distances.

6. The method of claim 1, wherein the registering includes the process of calculating a transformation that aligns two or more image elements, objects, images, and/or coordinate spaces to each other.

7. The method of claim 1, wherein the shared background coordinate space is a coordinate space of the first image, the second image, a third unrelated space, or a fourth space that is a result of the registration.

8. The method of claim 1, wherein the first object is the same type as the type of the second object.

9. The method of claim 1, wherein the first image element is the same type as the type of the second image element.

10. The method of claim 1, wherein the first object is the same object as the second object.

11. The method of claim 1, wherein the first image element is the same image element as the second image element.

12. The method of claim 1, wherein an output of the accuracy determination is graphical or numerical.

13. The method of claim 1, where in the registering occurs before or after the identifying steps.

14. A method for automatic determination of registration accuracy between a first image of a first object and a second image of a second object, comprising:

identifying a first image element in the first object by scanning the first image sequentially by image unit;

identifying a second image element in the second object by scanning the second image sequentially by the image unit;

registering the first image element to the second image element in a shared background coordinate space;

determining an accuracy of the registering by relating the first image element and the second image element to the shared background coordinate space, calculating a first distance between the first image element and a nearest point in the shared background coordinate space, calculating a second distance between the second image element and the nearest point in the shared background coordinate space, and calculating a difference between the first distance and the second distance, wherein the first image and the second image are three-dimensional;

the image unit is a voxel;

the scanning of the first image sequentially is circling from a first perimeter of the first image inward; and the scanning of the second image sequentially is circling from a second perimeter of the second image inward.

15. The method of claim 14, further comprising repeating the steps of the method for further first image elements and further second image elements.

16. The method of claim 15, wherein the registering of the first image element to the second image element in the shared background coordinate space comprises registering the further first image elements to the further second image elements in the shared background coordinate space, and minimizing a sum of the difference between the first distance and the second distance and further differences between further first distances and further second distances.

17. The method of claim 14, wherein the registering includes the process of calculating a transformation that aligns two or more image elements, objects, images, and/or coordinate spaces to each other.

18. The method of claim 14, wherein the shared background coordinate space is a coordinate space of the first image, the second image, a third unrelated space, or a fourth space that is a result of the registration.

19. The method of claim 14, wherein the first object is the same type as the type of the second object.

20. The method of claim 14, wherein the first image element is the same type as the type of the second image element.

21. The method of claim 14, wherein the first object is the same object as the second object.

22. The method of claim 14, wherein the first image element is the same image element as the second image element.

23. The method of claim 14, wherein an output of the accuracy determination is graphical or numerical.

24. The method of claim 14, where in the registering occurs before or after the identifying steps.

25. The method of claim 14, wherein:

the scanning of the first image sequentially is row by row; and the scanning of the second image sequentially is row by row.

* * * * *